(12) United States Patent
Karges et al.

(10) Patent No.: US 12,162,437 B2
(45) Date of Patent: Dec. 10, 2024

(54) LID RETAINING PENDULUM

(71) Applicant: Lear Corporation, Southfield, MI (US)

(72) Inventors: Mark Allen Karges, Macomb, MI (US); Patrick Michael Mackowiak, Chesterfield, MI (US); Nizar Freijy, Oxford, MI (US)

(73) Assignee: Lear Corporation, Southfield, MI (US)

( * ) Notice: Subject to any disclaimer, the term of this patent is extended or adjusted under 35 U.S.C. 154(b) by 147 days.

(21) Appl. No.: 17/989,007

(22) Filed: Nov. 17, 2022

(65) Prior Publication Data

US 2024/0166137 A1 May 23, 2024

(51) Int. Cl.
*B60R 7/04* (2006.01)
*B60N 2/75* (2018.01)

(52) U.S. Cl.
CPC .............. *B60R 7/043* (2013.01); *B60N 2/753* (2018.02)

(58) Field of Classification Search
CPC ...... A47C 1/0308; B60R 7/043; B60N 2/753; B60N 2/793; B60N 2/767
USPC ..................................................... 297/411.32
See application file for complete search history.

(56) References Cited

U.S. PATENT DOCUMENTS

| | | | | |
|---|---|---|---|---|
| 5,116,099 | A * | 5/1992 | Kwasnik | B60N 2/75 297/411.32 |
| 10,112,510 | B2 * | 10/2018 | Purves | B60N 2/433 |
| 10,352,076 | B2 * | 7/2019 | Selvakumar | B60N 2/793 |
| 10,434,907 | B2 * | 10/2019 | Deeken | B60N 2/753 |
| 11,084,407 | B2 * | 8/2021 | Keller | B60N 2/938 |
| 11,578,515 | B2 * | 2/2023 | Hodgson | E05C 3/12 |
| 2003/0155787 | A1 * | 8/2003 | Lein | B60N 2/793 296/24.34 |
| 2012/0001447 | A1 * | 1/2012 | Simon | B60R 7/04 292/226 |
| 2012/0074741 | A1 | 3/2012 | Anderson | |
| 2014/0054946 | A1 | 2/2014 | Pichler-Wilhelm et al. | |
| 2016/0052428 | A1 * | 2/2016 | Hessdörfer | B60N 2/753 297/411.32 |
| 2016/0090014 | A1 * | 3/2016 | Dinant | B60N 2/793 248/295.11 |
| 2017/0101036 | A1 * | 4/2017 | Purves | B60N 2/4249 |
| 2018/0056882 | A1 * | 3/2018 | Osterhoff | B60N 2/682 |
| 2018/0222371 | A1 * | 8/2018 | Nothroff | B60N 2/767 |
| 2018/0281649 | A1 | 10/2018 | Faruque et al. | |
| 2019/0118682 | A1 | 4/2019 | Faruque et al. | |
| 2019/0136592 | A1 * | 5/2019 | Muntean | B60N 2/793 |
| 2021/0053474 | A1 * | 2/2021 | Chen | B60N 2/793 |
| 2021/0253000 | A1 | 8/2021 | Xie et al. | |
| 2022/0340084 | A1 * | 10/2022 | Takano | B60R 7/04 |

FOREIGN PATENT DOCUMENTS

DE 102015012632 A1 * 3/2017 ............. B60N 2/767
WO WO-2019213487 A1 * 11/2019 ............. B60N 2/75

* cited by examiner

*Primary Examiner* — Jose V Chen
(74) *Attorney, Agent, or Firm* — MacMillan, Sobanski & Todd, LLC

(57) ABSTRACT

An armrest assembly for use on a vehicle seat and a method of manufacturing an armrest assembly that includes a co-extruded pendulum having a rigid core and at least one soft bumper. The pendulum operatively engages armrest components to selectively restrict opening of a lid on the armrest assembly.

20 Claims, 4 Drawing Sheets

LID RETAINING PENDULUM

BACKGROUND OF THE INVENTION

This invention relates to a vehicle storage assembly, and more particularly to a mechanism for selectively restraining opening of a storage lid.

Vehicles are known that provide lids that move between open and closed positions to allow or prevent access a space. The space may be, for example, a hollow interior of an assembly that acts as a storage bin. In some instances, the lid and storage bin assembly may be mounted to allow for pivoting between a deployed and a retracted position. For example, a lid and storage bin assembly that pivots between a deployed position, acting as an armrest, and a stowed position, acting as a seat back. When in a deployed position, the lid may be moved between a closed position and an open position by pivoting the lid relative to the storage bin assembly The lid and storage bin assembly may include a latch assembly that holds the lid in the closed position until actuated to allow the lid to move to the open position. Some latch assemblies may include a retainer, which may take the form of a pendulum, that prevents the actuation of the latch assembly when the lid and storage bin assembly is in the stowed position. Such an arrangement may prevent the lid from opening when the assembly is in the stowed position to thereby prevent contents of the storage bin from falling out of the storage bin. However, when a pendulum is employed, rattling of the pendulum with other adjacent components may produce sounds that are undesirable to vehicle occupants.

SUMMARY OF THE INVENTION

According to an aspect, the invention provides a latch assembly that retains a lid in a closed position relative to a storage bin assembly, when the storage bin assembly is in a stowed position, via a pendulum that includes materials of different hardness. The pendulum may pivot via gravity between a latch lock position and a latch release position, with a portion of the pendulum being a first material defining a rigid core to provide a locking function and another portion defining at least one soft bumper, which may allow for damping of noise (e.g., rattling).

According to an aspect, the invention provides an armrest assembly for use with a vehicle seat. The armrest assembly may include a housing, configured to be pivotable between a deployed position where the housing extends in a generally horizontal direction, and a retracted position where the housing extends in a generally vertical direction, and including a hollow interior portion; a lid mounted to the housing such that the lid is selectively movable between a closed position covering an opening providing access to the hollow interior portion and an open position providing access to the opening; a hinge pin operatively engaging the housing and extending in a generally horizontal direction; a latch assembly operatively engaging the housing such that the latch assembly is selectively movable between an engaged position where the latch assembly retains the lid in the closed position and a release position where the latch assembly allows the lid to be moved from the closed position to the open position, the latch assembly including a latch arm having a contact surface; and a pendulum having a rigid core co-extruded with at least one bumper formed of a more resilient material than the rigid core, the rigid core mounted to the hinge pin for rotation about the hinge pin, having a latch mating surface that faces downward due to gravity causing rotation of the pendulum about the hinge pin, the latch mating surface configured to selectively engage the contact surface to selectively prevent the latch assembly from moving to the release position, and the at least one bumper configured to contact the housing.

According to an aspect, the invention provides a method of manufacturing an armrest assembly The method may include: co-extruding a pendulum having a rigid core co-extruded with at least one bumper formed of a more resilient material than the rigid core, the rigid core including a pin engagement recess; and mounting the pin engagement recess of the pendulum on a hinge pin, for relatively free rotation about the hinge pin, the hinge pin being secured relative to a housing of the armrest assembly adjacent to a contact surface of a latch assembly configured to selectively release a lid on the armrest assembly from a closed position.

Various aspects of this invention will become apparent to those skilled in the art from the following detailed description of the preferred embodiments, when read in light of the accompanying drawings.

DETAILED DESCRIPTION OF THE PREFERRED EMBODIMENTS

This invention relates to an armrest assembly that can be a variety of different sizes and accessory features. The armrest assembly is generally mounted to a vehicle seat assembly, such as a bench seat; however, the armrest assembly may be mounted to another part of the vehicle, such as the vehicle floor, or may be cantilevered and extend from a seat or between two separate seats, such as between two bucket seats. The armrest assembly is applicable to front seat assemblies or rear seat assemblies such as, for example, a second or third row bench-style or bucket-style seats.

Figure 1:
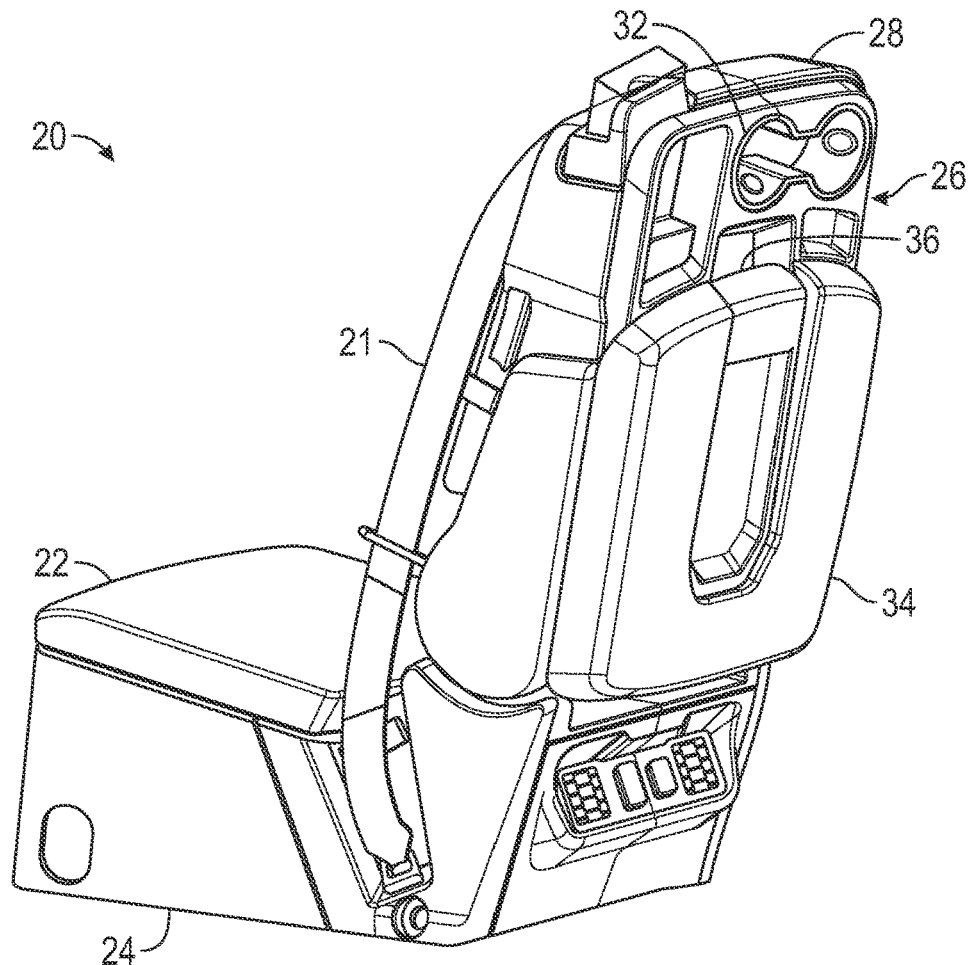
FIG. 1 is a schematic, perspective view of a portion of a vehicle seat, with an armrest assembly in a retracted position.
Figure 2:
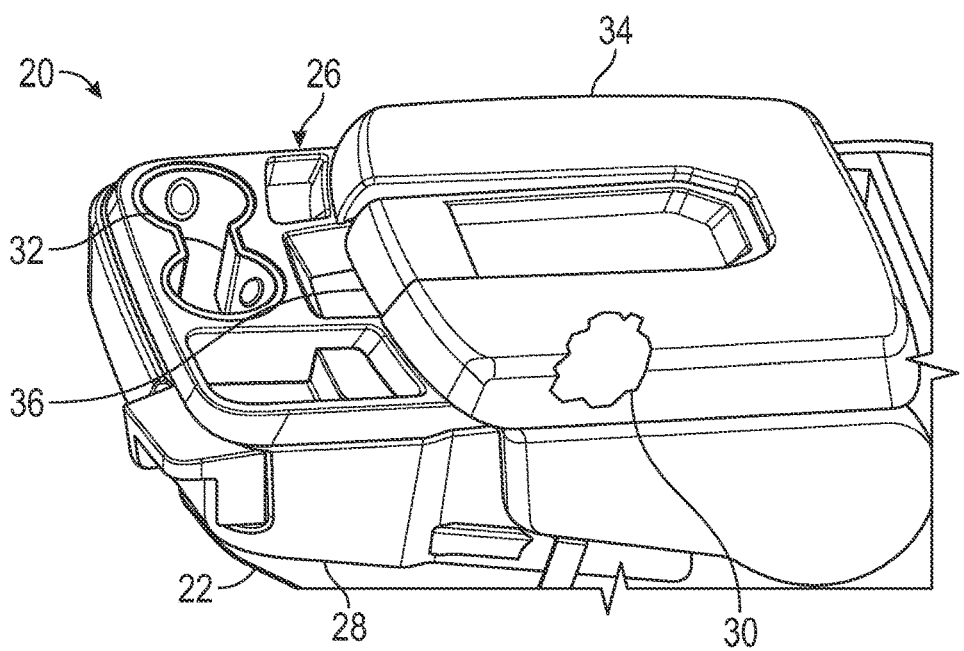
FIG. 2 is a schematic, perspective view of a portion of a vehicle seat, with an armrest assembly in a deployed position.

Referring now to the drawings, there is illustrated in FIGS. 1 and 2 an example of a vehicle seat assembly 20, which may include a seat belt assembly 21, and a seat bottom 22 coupled to a seat base 24 that may be mounted to vehicle structure. The vehicle seat assembly 20 may also include an armrest assembly 26 pivotally mounted relative to the seat bottom 22. FIG. 2 illustrates the armrest assembly 26 pivoted into the deployed position (extending in a generally horizontal direction) where the armrest assembly 26 may be employed by a vehicle occupant as an armrest. The armrest assembly 26 may, in addition to acting as an armrest, be configured to act as a seatback. FIG. 1 illustrates the armrest assembly 26 pivoted into a retracted position (extending in a generally horizontal direction) where the armrest assembly 26 may be employed by a vehicle occupant as a seatback.

In the example illustrated in FIGS. 1 and 2, the armrest assembly 26 includes a housing 28 that has a partially hollow interior 30, which defines a storage bin; recesses 32 that form cupholders, or other retention features for holding items in place in the vehicle; and a lid 34. The lid 34 is pivotally mounted to the housing 28 and movable between a closed position (shown in FIGS. 1 and 2) where the lid 34 covers an opening in the storage bin 30 to prevent access to the storage bin 30 and retain items in the storage bin 30, and an open position allowing access to the storage bin 30 while not retaining items in the storage bin 30. Accordingly, when the lid 34 is in a closed position and the armrest assembly 26 is in the deployed position, the lid 34 extends in a generally horizontal direction, while when the lid 34 is in a closed position and the armrest assembly 26 is in the retracted position, the lid 34 extends in a generally vertical direction. The lid 34 includes a latch handle (armrest lid release handle) 36 that can be actuated by a vehicle occupant.

Figure 3:
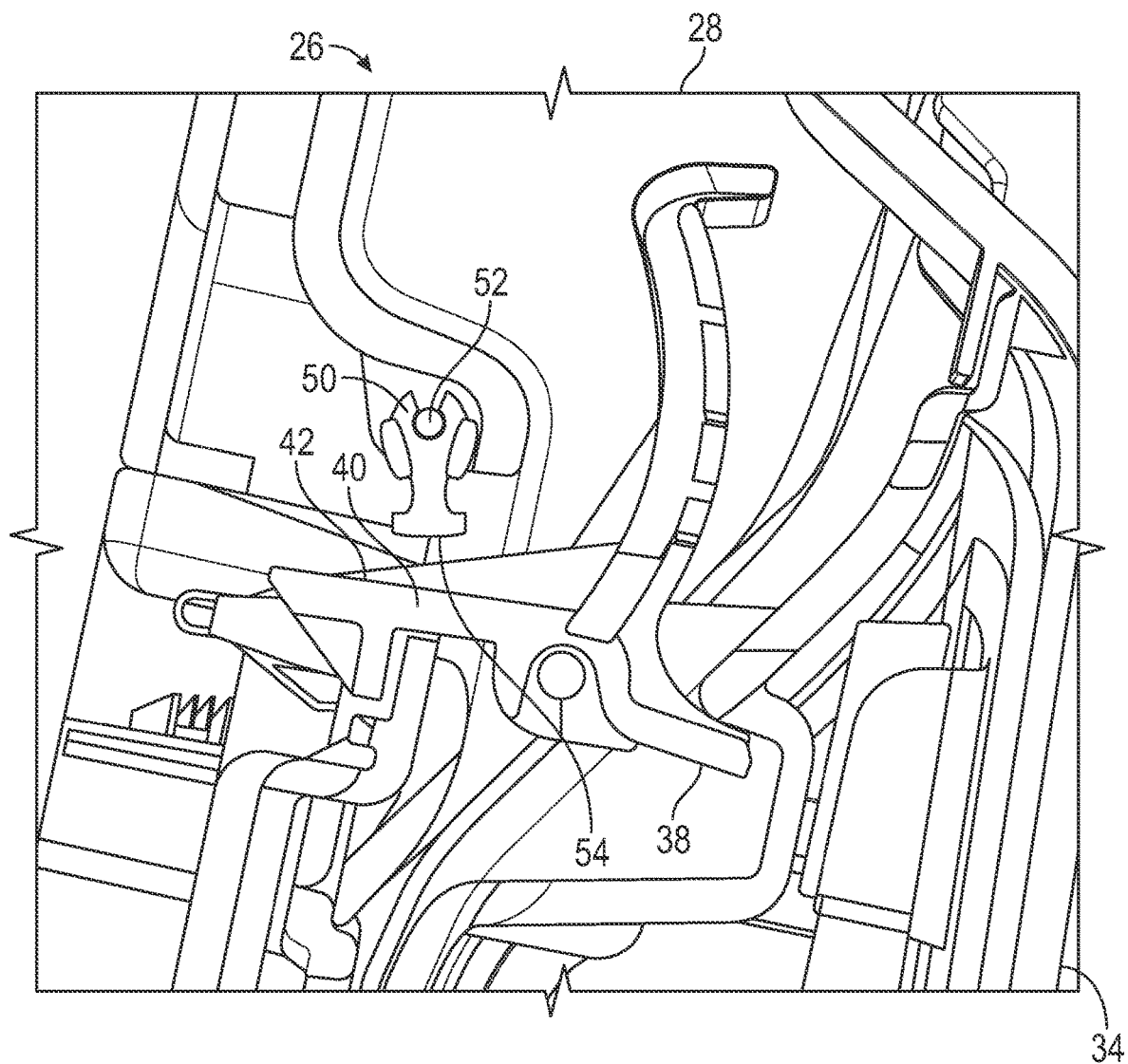
FIG. 3 is a schematic, elevation view of an interior portion of a vehicle seat, with a latch assembly in a free position and the armrest assembly in a retracted position.
Figure 4:
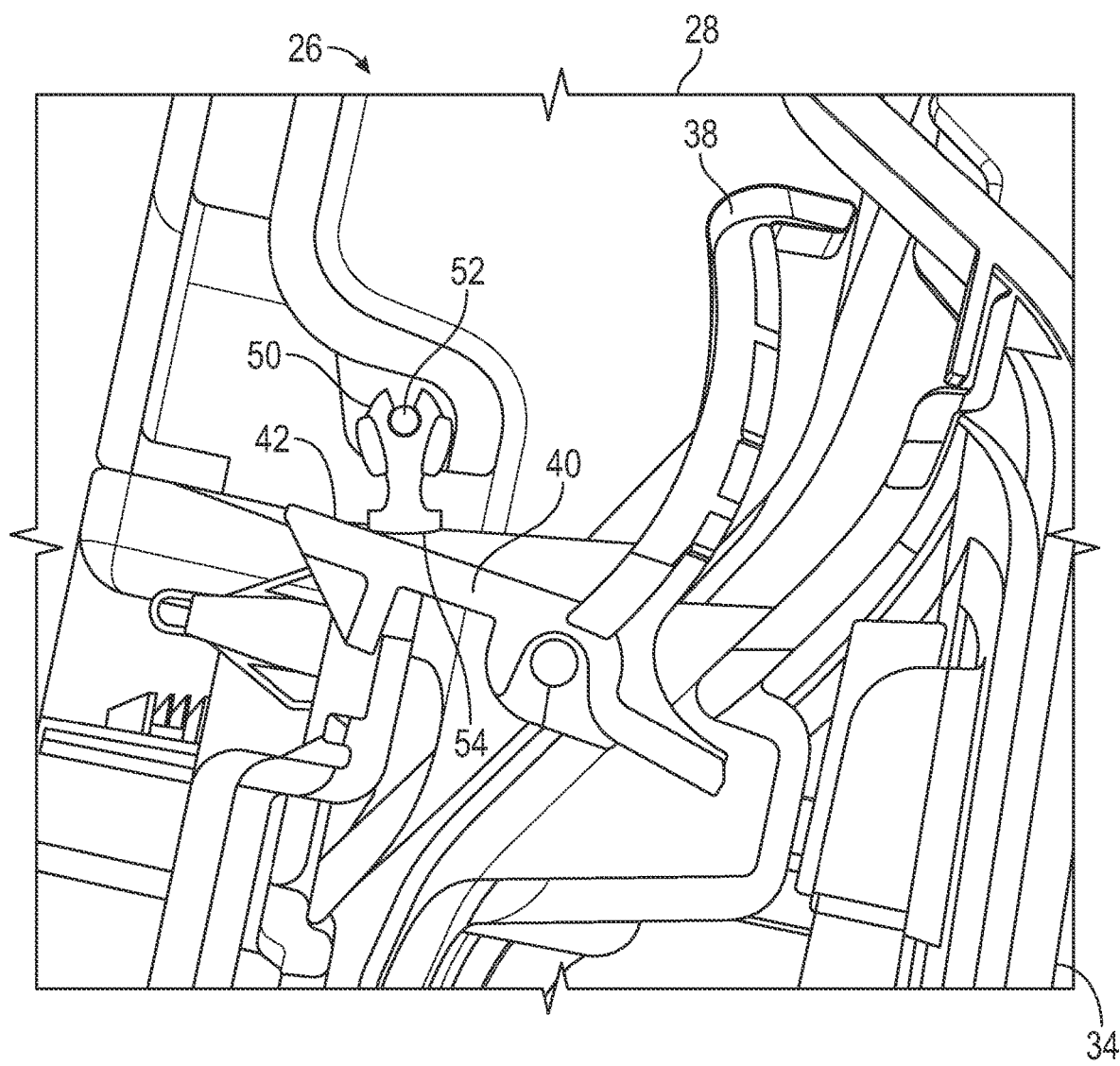
FIG. 4 is a schematic, elevation view of an interior portion of a vehicle seat, with a latch assembly in a partially actuated position and the armrest assembly in a retracted position.

Referring now to the example shown in FIGS. 3 and 4, in view of FIGS. 1 and 2, the armrest assembly 26 includes include a latch assembly 38 that is actuated by the latch handle 36. The latch assembly 38 includes a latch arm 40 that is pivotable to selectively release and engage the lid 34 to the housing 28. Moving the latch assembly 38 to a release-position causes releasing of the lid 34, which is when the latch assembly 38 allows the lid 34 to move from the closed position to the open position. When the latch assembly 38 is not actuated by a vehicle occupant, the latch assembly 38 is in an engaged position, which is when the latch assembly 38 prevents the lid 34 from moving out of the closed position.

The latch assembly 38 includes a pendulum 50, which is mounted on a hinge pin 52 for relatively free rotation about the hinge pin 52. The hinge pin 52 is mounted to the housing 28; oriented along a generally horizontal axis (generally horizontal when the armrest assembly 26 is in the deployed position and the retracted position). Essentially, an axis for the hinge pin 52 will be generally parallel to a pivot axis for the armrest assembly 26 when it is pivoted between its deployed and retracted positions. The pendulum 50 is configured so that a latch mating surface 54 is generally oriented facing downward (relative to gravity) no matter what position the armrest assembly 26 is in, with gravity causing the pendulum 50 to pivot relative to the hinge pin 52 as the armrest assembly 26 is pivoted between the deployed and retracted positions. The latch arm 40 includes a contact surface 42 that is adjacent to the latch mating surface 54 (a latch lock position of the pendulum 50, see, in particular, FIG. 3) when the armrest assembly 26 is in or close to being in the retracted position and is substantially spaced from the latch mating surface 54 when the armrest assembly 26 is in or close to being in the deployed position (due to gravity causing the pendulum 50 pivot away from the direction of the contact surface 42; a clockwise pivot relative to the housing 28, as viewed from the perspective of FIGS. 3 and 4, so that the latch mating surface 54 would be facing to the left, as viewed from the perspective of FIGS. 3 and 4).

In operation, when the armrest assembly 26 is in the deployed position, the pendulum 50 is oriented away from the contact surface 42, thus allowing a vehicle occupant to actuate the latch handle 36 far enough to move the latch assembly 38 to a release position. In the release position, the vehicle occupant may pivot the lid 34 from the closed position to the open position, gaining access to the storage bin 30. On the other hand, when the armrest assembly 26 is in the retracted position, the pendulum is oriented so that the latch mating surface 54 is adjacent to the contact surface 42 (see, in particular, FIG. 3). In this position, when a vehicle occupant attempts to actuate the latch handle 36, the contact surface 42 engages the latch mating surface 54 (see, in particular, FIG. 4), preventing the latch assembly 38 from moving to the release position, which in turn prevents the lid 34 from pivoting relative to the armrest assembly 26, in essence acting as a storage bin lock mechanism. By locking the lid 34 closed in this retracted position of the armrest assembly 26, when items in the storage bin 30 are likely to tumble out into the vehicle interior, a vehicle occupant is prevented from inadvertently opening the lid 34.

Figure 5:
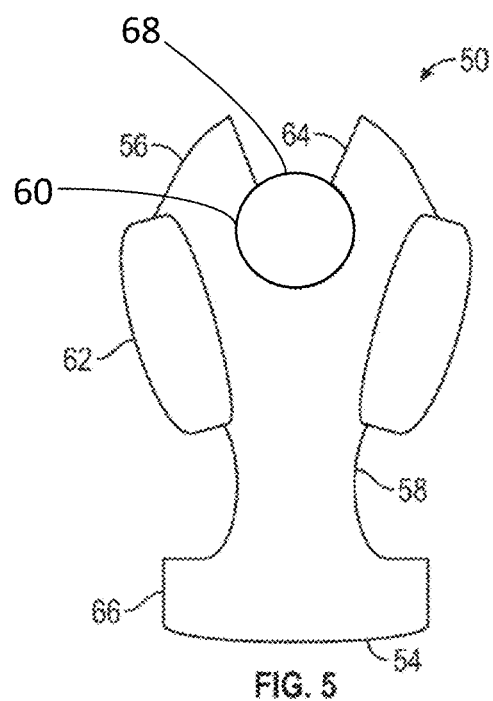
FIG. 5 is a schematic, elevation view of a pendulum.

Referring now to the example illustrated in FIG. 5, with reference to FIGS. 1-4, the pendulum 50 is co-extruded with two different materials; formed of two different materials from the same die, creating a bonded composite. The pendulum 50 includes a relatively rigid core 56, which comprises the latch mating surface 54 at a first end, a rigid central portion 58 and a pin engagement recess 60 adjacent to an opposed end. The pin engagement recess 60 operatively engages the hinge pin 52 to retain the pendulum 50 while allowing the pendulum 50 to relatively freely rotate about the hinge pin 52. The pin engagement recess 60 may be formed on a mandrel 68, allowing for a more consistent interior diameter and also allowing for the pendulum 50 to include a gap 64 that allows the pendulum 50 be radially snapped onto the hinge pin 52. The central portion 58 and the latch mating surface 54 cooperate to prevent a vehicle occupant from fully actuating the latch handle 36 when the armrest assembly 26 is in the retracted position; see, in particular, FIG. 4 where the latch mating surface 54 contacts the latch arm 40 to prevent the latch assembly 38 moving to the release position, thus preventing the lid 34 from moving out of the closed position. A wide portion 66 of the rigid core 56 adjacent to the latch mating surface 54 provides more surface area to assure that the latch mating surface 54 engages the latch arm 40 sufficiently to prevent the latch assembly 38 from moving to the release position. The stiffness of the rigid core 56 prevents the pendulum 50 from being deformed in such a way that a vehicle occupant might be able to release the lid 34 by applying sufficient force when the armrest assembly 26 is in the retracted position.

The pendulum 50 also includes one or more relatively soft bumpers 62 co-extruded with the rigid core 56. The bumpers 62 is formed from a material that, while not stiff enough to perform as the material for the rigid core 56 to prevent deflecting, is soft enough to reduce or eliminate any rattling sounds when the freely rotatable pendulum 50 may bump into other components of the armrest assembly 26, such as for example the portion of the housing 28 that forms the recesses 32. Such reduced or eliminated rattling sounds make the sound environment more pleasing for vehicle occupants. The soft bumpers 62 and the rigid core 56 may be shaped symmetrically about a line extending through the center of the pin engagement recess 60 and the latch mating surface 54. This symmetry allows for the pendulum 50 to be installed while eliminating a possibility of assembly in an incorrect orientation. The co-extruded materials for the core 56 and the bumpers 62 may be, for example, a rigid core material of about ten percent talc-filled polypropylene and bumpers made of plastic or rubber having about a 55 shore A hardness on a shore A hardness scale.

Figure 6:
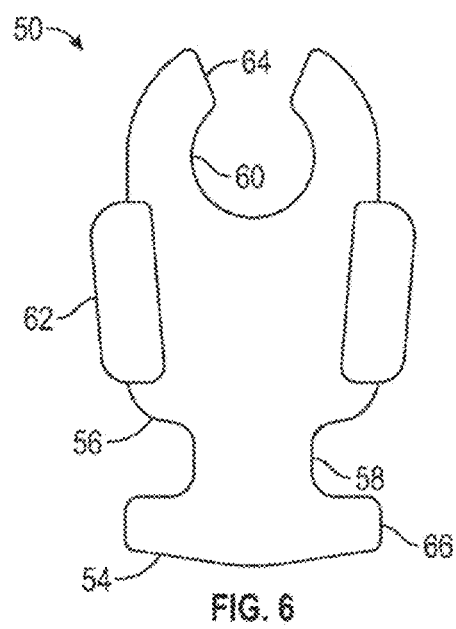
FIG. 6 is a schematic, elevation view of a pendulum.

Referring now to the example illustrated in FIG. 6, with reference to FIGS. 1-5, the pendulum 50 illustrated is similar to the pendulum discussed with reference to FIG. 5 and so the element numbers will be the same and the description thereof will not be repeated. The differences for the pendulum 50 of FIG. 6 are that the core 56 has a larger main portion around the pin engagement recess 60 and a shorter narrow portion adjacent to the latch mating surface 54. The soft bumpers 62 have a somewhat different shape to assure that any impacts with other portions of the housing 28 occur with the soft bumpers 62 rather than the rigid core 56.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An armrest assembly comprising:
a housing, pivotable between a deployed position where the housing extends in a generally horizontal direction, and a retracted position where the housing extends in a generally vertical direction, and including a hollow interior portion;
a lid mounted to the housing such that the lid is selectively movable between a closed position and an open position;
a hinge pin mounted to the housing and extending in a generally horizontal direction;
a latch assembly operatively engaging the housing such that the latch assembly is selectively movable between an engaged position where the latch assembly retains the lid in the closed position and a release position where the latch assembly allows the lid to be moved from the closed position to the open position, the latch assembly including a latch arm having a contact surface; and
a pendulum having a rigid core co-extruded with at least one bumper formed of a more resilient material than the rigid core, the rigid core mounted to the hinge pin for rotation about the hinge pin, having a latch mating surface that faces downward due to gravity causing rotation of the pendulum about the hinge pin, the latch mating surface configured to engage the contact surface to prevent the latch assembly from moving to the release position.

2. The armrest assembly of claim 1, wherein the pendulum is symmetrical about a line extending through a center of the pin engagement recess and the latch mating surface.

3. The armrest assembly of claim 1, wherein the rigid core is formed from material of about ten percent talc-filled polypropylene.

4. The armrest assembly of claim 3, wherein the at least one bumper is formed of a material having a 55 shore A hardness on a shore A hardness scale.

5. The armrest assembly of claim 4, wherein the rigid core includes a pin engagement recess having a gap and configured to operatively engage the hinge pin, the pin engagement recess formed on a mandrel.

6. The armrest assembly of claim 3, wherein the rigid core extends circumferentially outward adjacent to the latch mating surface.

7. The armrest assembly of claim 1, wherein the at least one bumper is formed of a material having a 55 shore A hardness on a shore A hardness scale.

8. The armrest assembly of claim 1, wherein the rigid core includes a pin engagement recess having a gap and configured to operatively engage the hinge pin, the pin engagement recess formed on a mandrel.

9. The armrest assembly of claim 1, wherein the rigid core extends circumferentially outward adjacent to the latch mating surface.

10. The armrest assembly of claim 1, wherein the at least one bumper is configured to be able to contact the housing while preventing the rigid core from contacting the housing.

11. A method of manufacturing an armrest assembly, the method comprising:
co-extruding a pendulum having a rigid core co-extruded with at least one bumper formed of a more resilient material than the rigid core, the rigid core including a pin engagement recess; and
mounting the pin engagement recess of the pendulum on a hinge pin, for relatively free rotation about the hinge pin, the hinge pin being secured relative to a housing of the armrest assembly adjacent to a contact surface of a latch assembly, wherein the latch assembly is configured to allow a lid on the armrest assembly to be moved from a closed position to an open position.

12. The method of claim 11, wherein the pendulum is symmetrical about a line extending through a center of the pin engagement recess and a latch mating surface at an opposed end of the pendulum from the pin engagement recess.

13. The method of claim 11, wherein the rigid core is formed from material of about ten percent talc-filled polypropylene.

14. The method of claim 13, wherein the at least one bumper is formed of a material having a 55 shore A hardness on a shore A hardness scale.

15. The method of claim 14, wherein the pin engagement recess has a gap, and further comprising forming the pin engagement recess of the rigid core on a mandrel.

16. The method of claim 11, wherein the at least one bumper is formed of a material having a 55 shore A hardness on a shore A hardness scale.

17. The method of claim 11, wherein the pin engagement recess has a gap, and further comprising forming the pin engagement recess of the rigid core on a mandrel.

18. The method of claim 11, wherein the at least one bumper is mounted to be able to contact the housing while preventing the rigid core from contacting the housing.

19. The armrest assembly of claim 1, wherein an axis of rotation of the hinge pin is parallel to a pivot axis of the housing when the housing is pivoted between the deployed position and retracted position.

20. The armrest assembly of claim 1, wherein the rigid core comprises a first portion around the pin engagement recess and a second portion adjacent to the latch mating surface, and wherein the second portion is narrower than the first portion.

* * * * *